(12) United States Patent
Rouleau et al.

(10) Patent No.: US 9,840,271 B2
(45) Date of Patent: Dec. 12, 2017

(54) RETRACTABLE STEERING COLUMN WITH RAKE LIMITER

(71) Applicant: STEERING SOLUTIONS IP HOLDING CORPORATION, Saginaw, MI (US)

(72) Inventors: James E. Rouleau, Burt, MI (US); Shawn A. Haring, Swartz Creek, MI (US); Michael Srda, Clio, MI (US); Todd M. King, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/193,692

(22) Filed: Jun. 27, 2016

(65) Prior Publication Data

US 2016/0375929 A1    Dec. 29, 2016

Related U.S. Application Data (60) Provisional application No. 62/186,002, filed on Jun. 29, 2015.

(51) Int. Cl.
   *B62D 1/187* (2006.01)
   *B62D 1/181* (2006.01)

(52) U.S. Cl.
   CPC ............ *B62D 1/187* (2013.01); *B62D 1/181* (2013.01)

(58) Field of Classification Search
   CPC .................................. B62D 1/181; B62D 1/187
   See application file for complete search history.

(56) References Cited

U.S. PATENT DOCUMENTS

| | | |
|---|---|---|
| 3,782,492 A | 1/1974 | Hollins |
| 4,315,117 A | 2/1982 | Kokubo et al. |
| 4,337,967 A | 7/1982 | Yoshida et al. |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

China Patent Application No. 201510204221.5 Second Office Action dated Mar. 10, 2017, 8 pages.

(Continued)

*Primary Examiner* — Drew J Brown
(74) *Attorney, Agent, or Firm* — Cantor Colburn LLP (57) ABSTRACT

A steering column assembly includes an outer jacket, an inner jacket, a pin, and a bracket. The inner jacket is configured to telescopically slide with respect to the outer jacket along a telescopic axis. The pin is engaged to and projects radially outward from one of the inner and outer jackets. The bracket is pivotally engaged to the other of the inner and outer jackets, and includes first and second surfaces that extend substantially axially and are generally opposed to one-another for selective contact with the pin to limit a pivoting range as a function of telescopic position.

20 Claims, 6 Drawing Sheets

(56) References Cited

U.S. PATENT DOCUMENTS

| | | |
|---|---|---|
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asagari et al. |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,170,862 B1 | 1/2001 | Hoagland et al. |
| 6,227,571 B1 | 5/2001 | Sheng et al. |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,578,449 B1 | 6/2003 | Anspaugh et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 2003/0046012 A1 | 3/2003 | Yamaguchi |
| 2003/0094330 A1 | 5/2003 | Boloorchi et al. |
| 2003/0188598 A1* | 10/2003 | Cartwright ............ B62D 1/184 74/493 |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0186658 A1* | 8/2006 | Yasuhara ............... B62D 1/184 280/775 |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0218637 A1* | 9/2010 | Barroso ................. B62D 1/183 74/493 |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Ulrich et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |

(56) References Cited

U.S. PATENT DOCUMENTS

| | | | |
|---|---|---|---|
| 2013/0199866 A1* | 8/2013 | Yamamoto | B62D 1/16 180/443 |
| 2013/0218396 A1 | 8/2013 | Moshchuk et al. | |
| 2013/0233117 A1 | 9/2013 | Read et al. | |
| 2013/0325202 A1 | 12/2013 | Howard et al. | |
| 2014/0028008 A1 | 1/2014 | Stadler et al. | |
| 2014/0046542 A1 | 2/2014 | Kauffman et al. | |
| 2014/0046547 A1 | 2/2014 | Kaufmann et al. | |
| 2014/0111324 A1 | 4/2014 | Lisseman et al. | |
| 2014/0277896 A1 | 9/2014 | Lathrop et al. | |
| 2014/0300479 A1 | 10/2014 | Wolter et al. | |
| 2014/0309816 A1 | 10/2014 | Stefan et al. | |
| 2015/0002404 A1 | 1/2015 | Hooton | |
| 2015/0014086 A1 | 1/2015 | Eisenbarth | |
| 2015/0032322 A1 | 1/2015 | Wimmer | |
| 2015/0051780 A1 | 2/2015 | Hahne | |
| 2015/0060185 A1 | 3/2015 | Feguri | |
| 2015/0120142 A1 | 4/2015 | Park et al. | |
| 2015/0137492 A1 | 5/2015 | Rao et al. | |
| 2015/0203145 A1* | 7/2015 | Sugiura | B62D 1/189 74/493 |
| 2015/0210273 A1 | 7/2015 | Kaufmann et al. | |
| 2015/0246673 A1 | 9/2015 | Tseng et al. | |
| 2015/0251666 A1 | 9/2015 | Attard et al. | |
| 2015/0283998 A1 | 10/2015 | Lind et al. | |
| 2015/0324111 A1 | 11/2015 | Jubner et al. | |
| 2016/0009332 A1 | 1/2016 | Sirbu | |
| 2016/0075371 A1 | 3/2016 | Varunkikar et al. | |
| 2016/0082867 A1 | 3/2016 | Sugioka et al. | |
| 2016/0185387 A1 | 6/2016 | Kuoch | |
| 2016/0200246 A1 | 7/2016 | Lisseman et al. | |
| 2016/0200343 A1 | 7/2016 | Lisseman et al. | |
| 2016/0200344 A1 | 7/2016 | Sugioka et al. | |
| 2016/0207538 A1 | 7/2016 | Urano et al. | |
| 2016/0209841 A1 | 7/2016 | Yamaoka et al. | |
| 2016/0229450 A1 | 8/2016 | Basting et al. | |
| 2016/0231743 A1 | 8/2016 | Bendewald et al. | |
| 2016/0244070 A1 | 8/2016 | Bendewald et al. | |
| 2016/0318540 A1 | 11/2016 | King | |
| 2016/0318542 A1 | 11/2016 | Pattok et al. | |
| 2016/0347347 A1 | 12/2016 | Lubischer | |
| 2016/0347348 A1 | 12/2016 | Lubischer | |
| 2016/0362084 A1 | 12/2016 | Martin et al. | |
| 2016/0362117 A1 | 12/2016 | Kaufmann et al. | |
| 2016/0362126 A1 | 12/2016 | Lubischer | |
| 2016/0368522 A1 | 12/2016 | Lubischer | |
| 2016/0375770 A1 | 12/2016 | Ryne et al. | |
| 2016/0375860 A1 | 12/2016 | Lubischer | |
| 2016/0375923 A1 | 12/2016 | Schulz | |
| 2016/0375924 A1 | 12/2016 | Bodtker et al. | |
| 2016/0375925 A1 | 12/2016 | Lubischer et al. | |
| 2016/0375926 A1 | 12/2016 | Lubischer et al. | |
| 2016/0375927 A1 | 12/2016 | Schulz et al. | |
| 2016/0375928 A1 | 12/2016 | Magnus | |
| 2016/0375931 A1 | 12/2016 | Lubischer | |
| 2017/0029009 A1 | 2/2017 | Rouleau | |
| 2017/0029018 A1 | 2/2017 | Lubischer | |
| 2017/0113589 A1 | 4/2017 | Riefe | |
| 2017/0113712 A1 | 4/2017 | Watz | |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102452391 A | 5/2012 |
| CN | 103419840 A2 | 12/2013 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 1020081057313 A1 | 10/2009 |
| DE | 102010025197 A1 | 12/2011 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | H05162652 A | 6/1993 |
| KR | 20100063433 A | 6/2010 |
| WO | 2006099483 A1 | 9/2006 |
| WO | 2010082394 A1 | 7/2010 |
| WO | 2010116518 A1 | 10/2010 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated: Jun. 6, 2013; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Varunjikar, Tejas; Design of Horizontal Curves With DownGrades Using Low-Order Vehicle Dynamics Models; A Theisis by T. Varunkikar; 2011; 141 pages.

\* cited by examiner

RETRACTABLE STEERING COLUMN WITH RAKE LIMITER

CROSS-REFERENCE TO RELATED APPLICATION

This patent application claims priority to U.S. Provisional Patent Application Ser. No. 62/186,002, filed Jun. 29, 2015, which is incorporated herein by reference in its entirety.

BACKGROUND OF THE INVENTION

The present disclosure relates to steering column assemblies, and more particularly, to assemblies with mutually dependent rake and telescopic positions.

Steering column assemblies for automobiles are known to include various adjustment devices that permit an operator to selectively position and secure the steering column in any one of a variety of positions. Such adjustment devices may include a rake device that facilitates tilting of the steering column and a telescopic device that facilitates the length of the column which generally dictates how close a steering wheel is positioned to the operator (i.e., extended position) and/or how close to the instrument cluster of the automobile (i.e., retracted position). Unfortunately, the extent of a retracted position may be limited by the full range of the rake positions in order to prevent the steering wheel from contacting surrounding components during adjustment.

Accordingly, it is desirable to provide a mechanism that limits the range of rake positions with such limits dependent upon a particular telescopic position.

SUMMARY OF THE INVENTION

In one exemplary and non-limiting embodiment of the present disclosure, a steering column assembly includes a support structure, a first jacket, a second jacket and a member. The support structure includes first and second surfaces that are substantially opposed to one-another. The first jacket is pivotally engaged to the support structure about a pivot axis. The second jacket is configured to telescopically slide with respect to the first jacket along a telescopic axis. The member is engaged to and projects radially outward from the second jacket with respect to the telescopic axis. The first and second surfaces extend substantially axially with respect to the telescopic axis and are configured for selective contact with the member to limit a pivoting range of the first jacket as a function of telescopic position of the second jacket.

In another exemplary embodiment, a steering column assembly includes an outer jacket, an inner jacket, a pin, and a bracket. The inner jacket is configured to telescopically slide with respect to the outer jacket along a telescopic axis. The pin is engaged to and projects radially outward from one of the inner and outer jackets. The bracket is pivotally engaged to the other of the inner and outer jackets, and includes first and second surfaces that extend substantially axially and are generally opposed to one-another for selective contact with the pin to limit a pivoting range as a function of telescopic position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a steering column assembly 20 of the present disclosure is capable of selective adjustment both telescopically and tilt-wise (i.e., rake). The assembly 20 is configured such that the full range of angular rake motion is dependent upon the specific telescopic position.

Referring to FIGS. 1 through 5, the steering column assembly 20 may include a steering shaft 22 mounted for rotation, first and second column jackets 24, 26, and a support structure 28. The support structure 28 may be a rake bracket that may be rigidly attached to a dash structure and/or may be integral to the dash structure or other structure of a vehicle chassis. The first column jacket 24 may be a forward column jacket (i.e., forward and away from a vehicle driver), and may include a forward end portion pivotally engaged to the support structure 28. The second column jacket 26 may be a rearward column jacket (at least in-part rearward of the first column jacket 24 and forward of the vehicle driver), and may be telescopically connected to the first column jacket 24 thereby projecting in a rearward direction (see arrow 29). The steering shaft 22 may extend along and through the first and second column jackets 24, 26, and may include a plurality of splines 34 at a distal end for engagement to a hand steering wheel (not shown).

The first column jacket 24 may pivot about a pivot axis 32, and may be further constructed and arranged to pivot between a multitude of rake positions that may be selected by the vehicle driver. Similarly, the second column jacket 26 may be constructed and arranged to slide with respect to the first column jacket 24 along a telescopic axis 30 and between a multitude of telescopic positions (i.e., extended and retracted states) that may be selected by the vehicle driver. It is further contemplated and understood that the first column jacket 24 may be generally positioned lower than the second column jacket 26, and the second column jacket 26 may be at least in-part disposed radially inward from the first column jacket 24 with respect to telescopic axis 30.

The steering column assembly 20 may further include a member 36 that may be rigidly engaged to the second column jacket 26, and may project substantially radially outward from the jacket 26 with respect to telescopic axis 30 and along a centerline 38. The centerline 38 may be substantially parallel to the pivot axis 32 and substantially normal to the telescopic axis 30. The member 36 may project through a slot 40 in the first column jacket 24 that extends substantially axially with respect to the telescopic axis 30.

The member 36 may include any variety of shapes, and may be a pin that may be substantially cylindrical.

Figure 1:
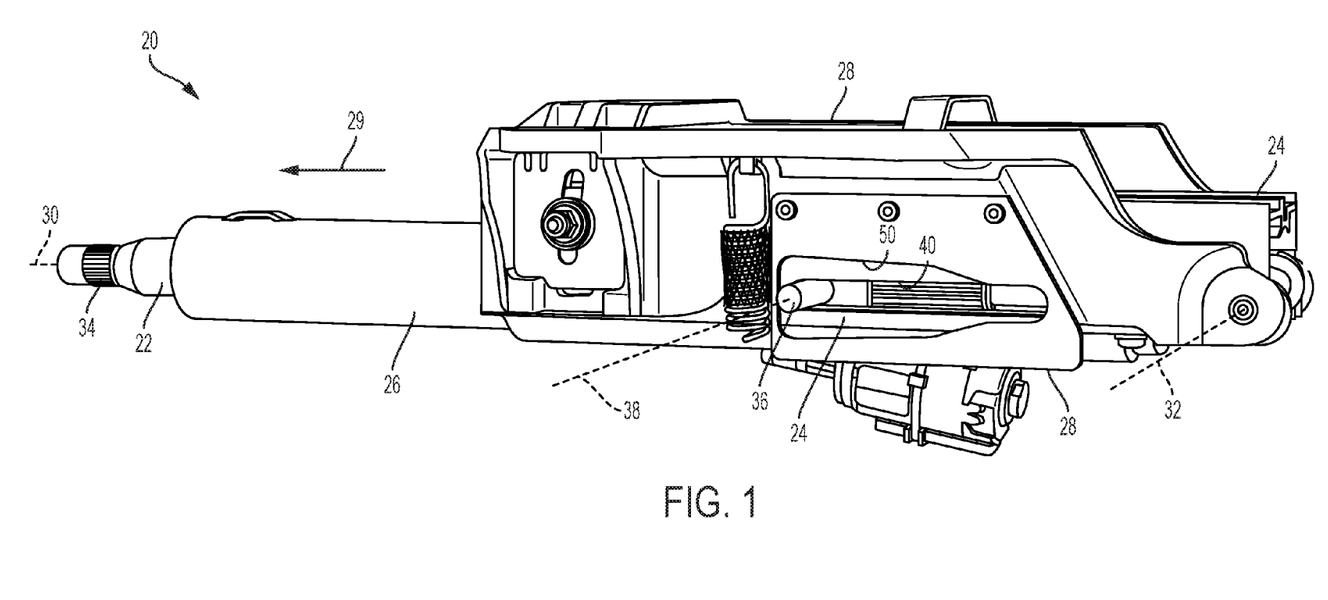
FIG. 1 is a side view of a steering column assembly in accordance with an exemplary embodiment of the present disclosure.
Figure 2:
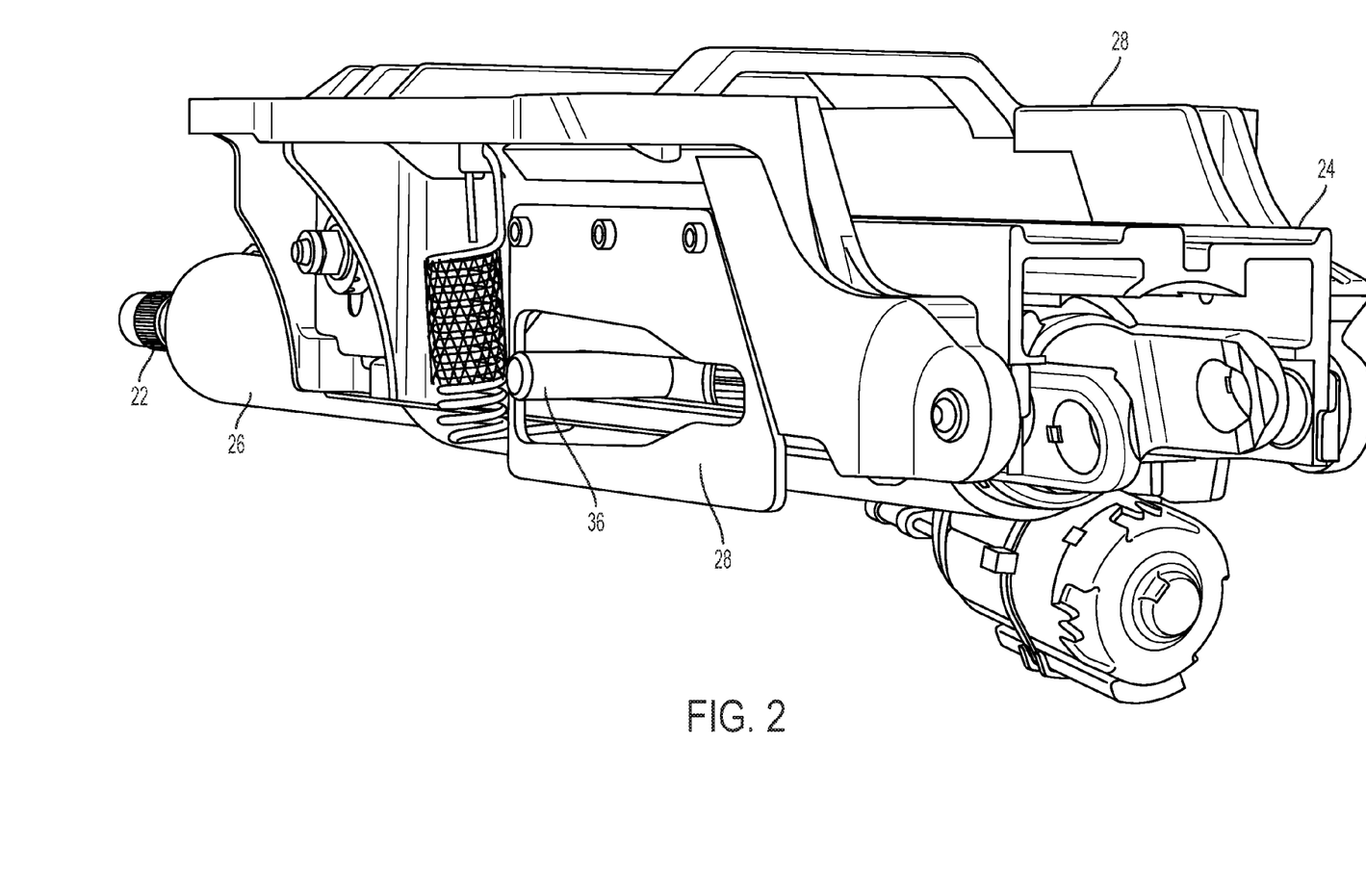
FIG. 2 is a perspective rear view of the steering column assembly.
Figure 3:
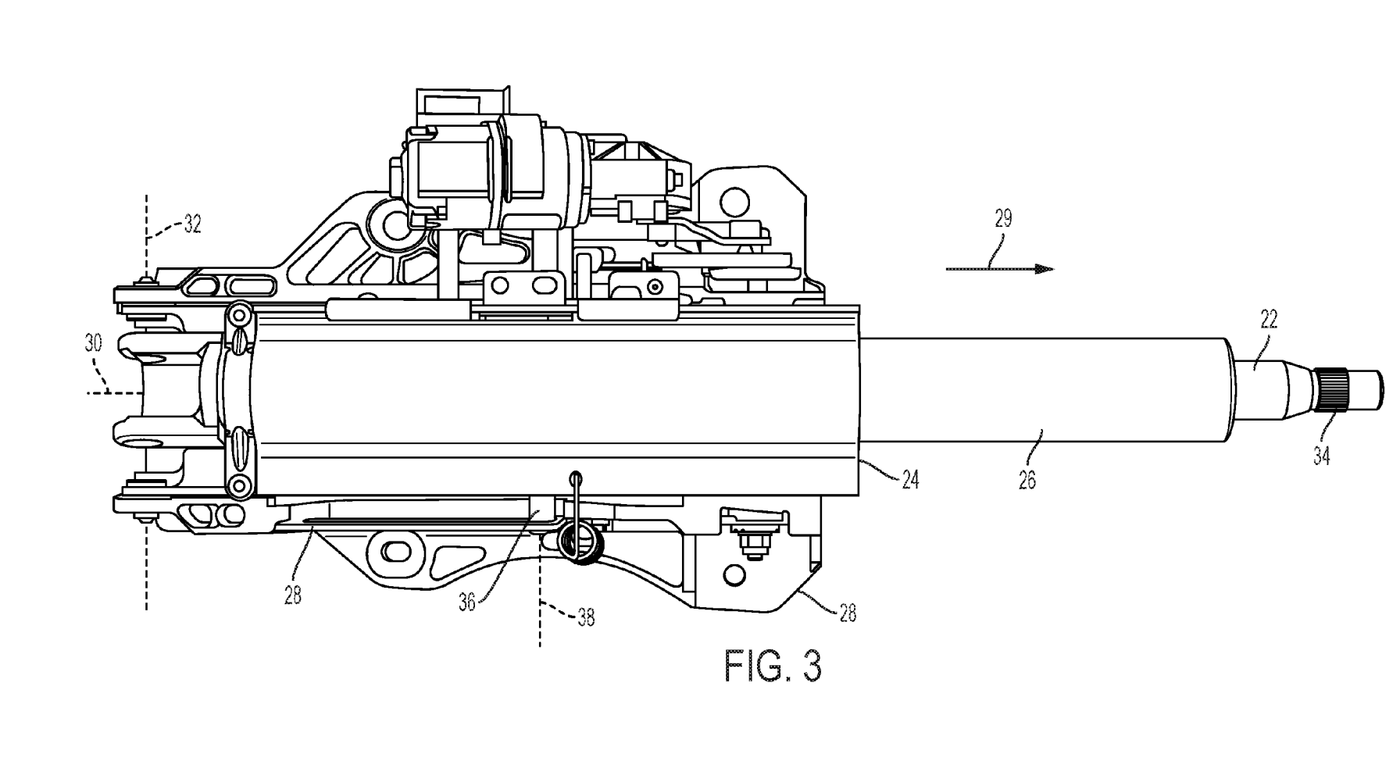
FIG. 3 is a bottom view of the steering column assembly.
Figure 4:
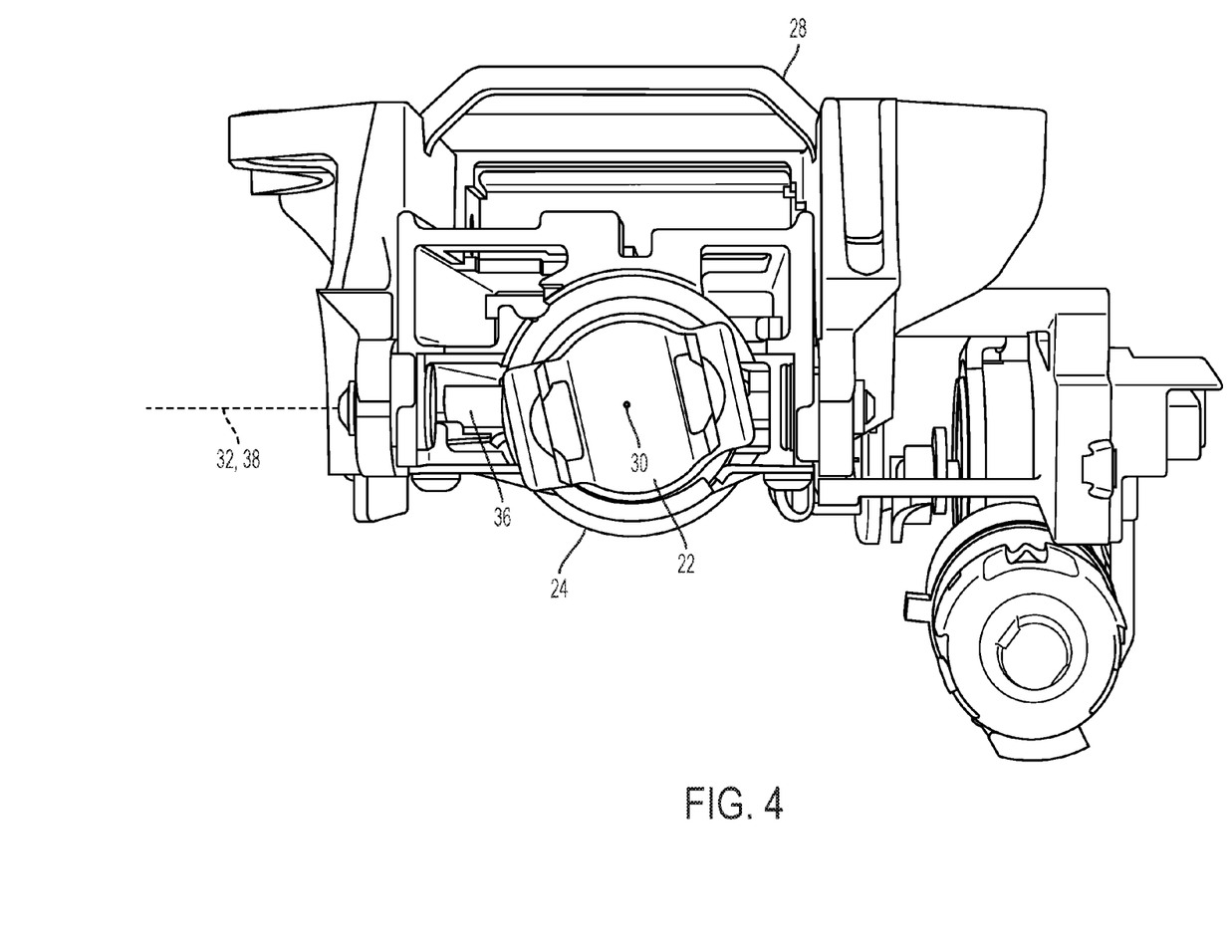
FIG. 4 is rear view of the steering column assembly.
Figure 5:
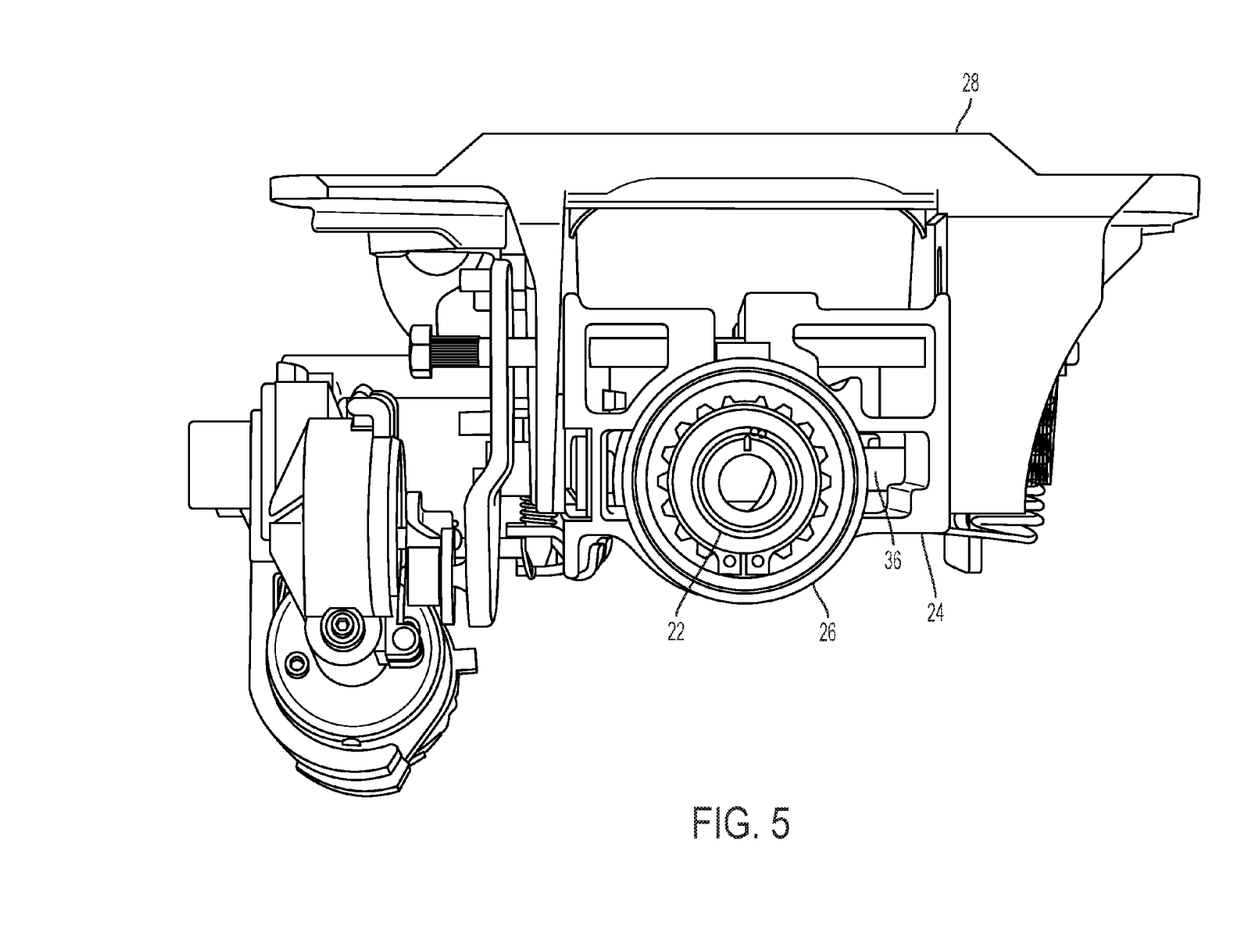
FIG. 5 is a front view of the steering column assembly.
Figure 6:
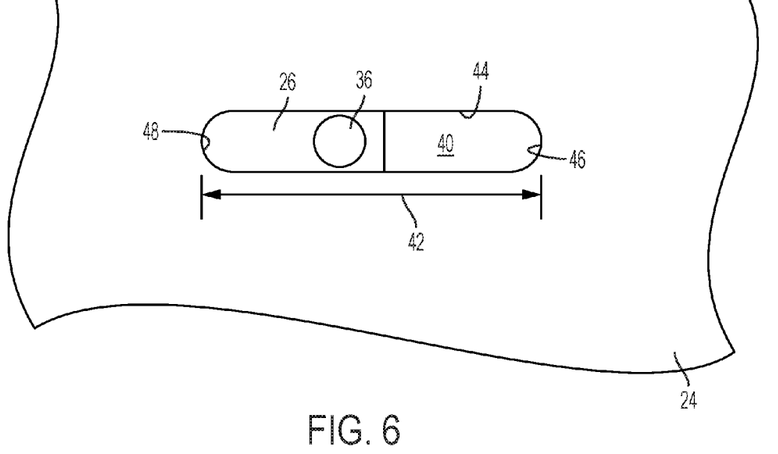
FIG. 6 is a partial plan view of a lower column jacket and pin of the steering column assembly.
Figure 7:
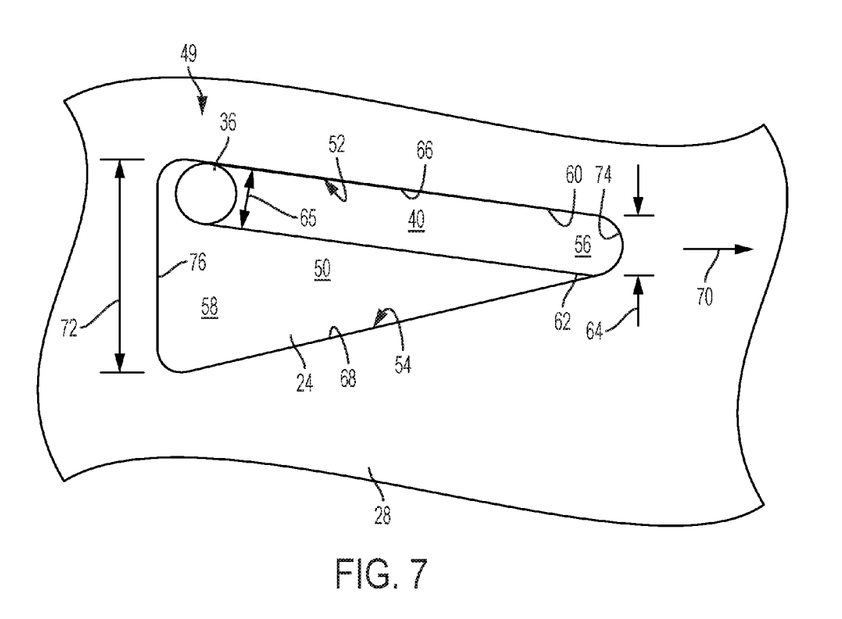
FIG. 7 is a partial plan view of a bracket and the pin of the steering column assembly.

Referring to FIGS. 6 and 7, the slot 40 may have an axial length (see arrow 42) that is about equivalent to or greater than the maximum telescoping travel of the second column jacket 26 with respect to the first column jacket 24. The slot 40 may generally be defined by an edge 44 carried by the first column jacket 24. The edge 44 may be continuous, and may include a forward stop portion 46 and a rearward stop portion 48 orientated to limit the telescoping travel of the second column jacket 26 along telescopic axis 30.

In operation and when the assembly 20 is in a fully extended position (i.e., telescopically), the member 36 may be in contact with the rearward stop portion 48, and when the assembly 20 is in a fully retracted position, the member 36 may be in contact with the forward stop portion 46. It is further contemplated and understood that the assembly 20 may include alternative telescopic indexes and/or stops that may not be carried by the edge 44. For example, telescopic stops may be carried between the jackets 24, 26 at other locations and not being associated with the member 36 as part of the indexing feature. It is further understood that the slot 40 may be any clearance or opening that permits movement of the member 36 in an axial direction with respect to the telescopic axis 30 as the jackets 24, 26 move between extended and retracted positions.

The steering column assembly 20 may further include a rake limiter 49 that may include the member 36 and a contoured cavity 50 in the support structure 28 for receipt of the member 36. The member 36 extends through the slot 40 in the first column jacket 24 and into the contoured cavity 50 of the rake limiter 49. The cavity 50 is generally contoured to limit the rake travel as a function of telescopic position along axis 30. The contoured cavity 50 includes boundaries defined by, at least in-part, opposing first and second surfaces 52, 54 (see FIG. 7) carried by the support structure 28. The surfaces 52, 54 may substantially oppose one-another with the first surface 52 facing substantially downward and the second surface 54 facing substantially upward. In operation of the rake limiter 49, the member 36 may contact the first surface 52 when the steering shaft 22, along with the column jackets 24, 24 is pivotally raised to a maximum upper rake position (i.e., as illustrated in FIG. 7). Similarly, the member 36 may contact the second surface 54 when the steering shaft 22 is lowered to a maximum lower rake position (not illustrated).

The contoured cavity 50 may further include a forward portion 56 and a rearward portion 58. The forward portion 56 may include boundaries defined by opposing first segments 60, 62 of the respective first and second surfaces 52, 54. The first segments 60, 62 may be spaced from one-another by a distance (see arrow 64) that generally designates a minimum angular rake range of travel that may be about zero rake travel. That is, the distance 64 may be about equal to or slightly greater than a width (see arrow 65) of the member 36 that is in the forward portion 56.

The rearward portion 58 of the contoured cavity 50 may include boundaries defined by opposing second segments 66, 68 of the respective first and second surfaces 52, 54. The second segments 66, 68 may generally converge upon one another as they extend in a forward direction 70 to meet the respective first segments 60, 62. In operation of the assembly 20, and when the column jackets 24, 26 are about fully extended telescopically, a distance (see arrow 72) between the second segments 66, 68 may be at a maximum distance designating a maximum angular rake tilting range.

The contoured cavity 50 may be further defined by a forward surface 74 that generally faces rearward and connects forward ends of the first segments 60, 62, and a rearward surface 76 that generally faces forward and connects rearward ends of the second segments 66, 68. The forward and rearward surfaces 74, 76 may generally be stops configured to contact the member 36 instead of the stops 46, 48 previously described.

In operation, an operator of a vehicle may select a fully extended position of the steering column assembly 20. While the second column jacket 26 is moving rearward along the telescopic axis 30, from a retracted state and toward a fully extended state, the member 36 moves away from the forward stop 46 and toward the rearward stop 48. When the second column jacket 26 is not generally in the fully retracted state, the assembly 20 may be tilted or raked in an upward and/or downward pivotal direction and until the member contacts the respective second segments 66, 68.

When the steering column assembly 20 may also be placed in a fully retracted position. In such a position, the contoured cavity 50 (i.e., defined by surfaces 52, 54) may be contoured (e.g., surfaces 52, 54 may converge), such that the steering wheel (not shown) or other moving components is prevented from contacting surrounding stationary components (e.g., eyebrow of an instrument cluster). To prevent such contact, the rake tilting range may be less than the tilting range when the steering column assembly 20 is in the fully extended position. It is further contemplated and understood that when the assembly 20 is in or near the fully retracted position, the rake tilting range may be generally close to zero (i.e., no tilt adjustment capability) thus the rake may be a nominal position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a support structure including first and second surfaces that are substantially opposed to one-another;
    a first jacket pivotally engaged to the support structure about a pivot axis;
    a second jacket configured to telescopically slide with respect to the first jacket along a telescopic axis; and
    a member engaged to and projecting radially outward from the second jacket with respect to the telescopic axis, and wherein the first and second surfaces extend substantially axially with respect to the telescopic axis and are configured for selective contact with the member to limit a pivoting range of the first jacket as a function of telescopic position of the second jacket.

2. The steering column assembly set forth in claim 1, wherein the second jacket is disposed at least in-part radially inward of the first jacket.

3. The steering column assembly set forth in claim 1, wherein the support structure is stationary.

4. The steering column assembly set forth in claim 3, wherein the support structure is a rake bracket.

5. The steering column assembly set forth in claim 1, wherein the member is a pin extending along a centerline that is substantially normal to the telescopic axis.

6. The steering column assembly set forth in claim 5, wherein the pivot axis is substantially normal to the telescopic axis.

7. The steering column assembly set forth in claim 6, wherein the centerline is substantially parallel to the pivot axis.

8. The steering column assembly set forth in claim 1, wherein the member is engaged to the second jacket and extends through an opening in the first jacket.

9. The steering column assembly set forth in claim 8, wherein the opening is axially elongated with respect to the telescopic axis and is defined in-part by forward and rearward stops of the first jacket for contact with the member thereby limiting a telescoping range.

10. The steering column assembly set forth in claim 1, wherein the first and second surfaces converge toward one-another in a telescoping direction along the telescopic axis.

11. The steering column assembly set forth in claim 9, wherein the first and second surfaces converge toward one-another in a telescoping direction along the telescopic axis.

12. The steering column assembly set forth in claim 11, wherein the member extends along a centerline that is substantially parallel to the pivot axis and normal to the telescopic axis.

13. The steering column assembly set forth in claim 12, wherein the first and second surfaces define at least in-part a cavity in the structure for receipt of the member.

14. The steering column assembly set forth in claim 13, wherein the cavity has a forward portion defined by opposing first segments of the respective first and second surface that extend substantially parallel to the telescopic axis.

15. The steering column assembly set forth in claim 14, wherein the cavity has a second portion disposed rearward of the forward portion and defined by opposing second segments of the respective first and second surfaces that converge toward one another as the second segments extend toward the respective first segments.

16. The steering column assembly set forth in claim 15, wherein the forward portion is defined in part by a forward stop carried by the support structure and spanning between the opposing first segments.

17. A steering column assembly comprising:
an outer column jacket;
an inner column jacket configured to telescopically slide with respect to the outer column jacket along a telescopic axis;
a pin engaged to and projecting radially outward from one of the inner and outer jackets; and
a bracket pivotally engaged to the other of the inner and outer jackets, the bracket including first and second surfaces that extend substantially axially and are generally opposed to one-another for selective contact with the pin to limit a rake tilting range of the outer jacket as a function of telescopic position.

18. The steering column assembly set forth in claim 17, wherein the pin is engaged to the inner jacket and extends through an axially extending slot in the outer jacket and the outer jacket is pivotally engaged to the bracket.

19. The steering column assembly set forth in claim 18, wherein the slot is defined in part by forward and rearward stops for contact with the pin and configured to limit a telescoping range.

20. A rake limiter for an extendable steering column assembly having a first jacket pivotally engaged to a support structure about a pivot axis and a second jacket configured to telescopically slide with respect to the first jacket along a telescopic axis disposed normal to the pivot axis, the rake limiter comprising:
a member engaged to and projecting radially outward from the second jacket with respect to the telescopic axis; and
first and second surfaces carried by the support structure and disposed substantially in opposition to one-another, and defining at least in-part a contoured cavity for receipt of the member, and wherein the first and second surfaces are constructed and arranged to contact the member to limit a rake tilting range of the first jacket as a function of telescopic position of the second jacket.

* * * * *